United States Patent
Hashimoto et al.

(10) Patent No.: US 11,708,669 B2
(45) Date of Patent: Jul. 25, 2023

(54) ROAD PAVING METHOD

(71) Applicant: KAO CORPORATION, Tokyo (JP)

(72) Inventors: Ryoichi Hashimoto, Iwade (JP); Ryoji Iwamoto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 824 days.

(21) Appl. No.: 16/631,087

(22) PCT Filed: Jul. 17, 2018

(86) PCT No.: PCT/JP2018/026720
§ 371 (c)(1),
(2) Date: Jan. 14, 2020

(87) PCT Pub. No.: WO2019/017335
PCT Pub. Date: Jan. 24, 2019

(65) Prior Publication Data
US 2020/0149226 A1    May 14, 2020

(30) Foreign Application Priority Data

Jul. 18, 2017  (JP) .................................. 2017-139243
Jul. 17, 2018  (JP) .................................. 2018-134130

(51) Int. Cl.
| | |
|---|---|
| *E01C 7/00* | (2006.01) |
| *E01C 7/18* | (2006.01) |
| *C08G 64/04* | (2006.01) |
| *C08K 3/36* | (2006.01) |
| *C08L 25/10* | (2006.01) |
| *C08L 53/00* | (2006.01) |
| *C08L 67/02* | (2006.01) |
| *C08L 67/03* | (2006.01) |
| *C08L 95/00* | (2006.01) |
| *E01C 7/30* | (2006.01) |

(52) U.S. Cl.
CPC ................ *E01C 7/18* (2013.01); *C08G 64/04* (2013.01); *C08K 3/36* (2013.01); *C08L 25/10* (2013.01); *C08L 53/00* (2013.01); *C08L 67/025* (2013.01); *C08L 67/03* (2013.01); *C08L 95/00* (2013.01); *E01C 7/30* (2013.01); *C08K 2201/003* (2013.01)

(58) Field of Classification Search
CPC .. E01C 7/18; E01C 7/30; C08G 64/04; C08K 3/36; C08K 2201/003; C08L 25/10; C08L 53/00; C08L 67/025; C08L 67/03; C08L 95/00
USPC .................................... 404/18–111
See application file for complete search history.

(56) References Cited

U.S. PATENT DOCUMENTS

| | | | |
|---|---|---|---|
| 5,328,943 A | 7/1994 | Isobe et al. | |
| 5,708,062 A | 1/1998 | Maillet et al. | |
| 5,710,209 A * | 1/1998 | Blum | C08G 18/6659 524/591 |
| 5,990,206 A * | 11/1999 | Tanaka | C08L 95/00 524/68 |
| 2004/0127614 A1* | 7/2004 | Jiang | C09J 7/20 524/270 |
| 2010/0210745 A1* | 8/2010 | McDaniel | C09D 7/48 521/55 |
| 2011/0034593 A1* | 2/2011 | Gonzalez Leon | C08G 83/008 524/68 |
| 2011/0240064 A1* | 10/2011 | Wales | C09D 7/65 428/116 |
| 2014/0378603 A1 | 12/2014 | Avramidis et al. | |
| 2016/0376420 A1* | 12/2016 | Yano | C09J 171/02 524/297 |
| 2017/0226343 A1 | 8/2017 | Kim | |
| 2019/0233647 A1 | 8/2019 | Takahashi et al. | |
| 2019/0359827 A1 | 11/2019 | Shirai | |

FOREIGN PATENT DOCUMENTS

| | | |
|---|---|---|
| CN | 1166850 A | 12/1997 |
| CN | 101608069 A | 12/2009 |
| CN | 103509356 A | 1/2014 |
| CN | 106012734 A | 10/2016 |
| EP | 0425151 A1 | 5/1991 |
| EP | 3124546 A1 | 2/2017 |
| EP | 3 476 899 A1 | 5/2019 |

(Continued)

OTHER PUBLICATIONS

Ahmad et al., "Utilization of polyethylene terephthalate (PET) in asphalt pavement: A review", IOP Conf. Series: Materials Science and Engineering, 2017, vol. 203, pp. 1-7 ( 8 pages).

(Continued)

*Primary Examiner* — Raymond W Addie
(74) *Attorney, Agent, or Firm* — Birch, Stewart, Kolasch & Birch, LLP

(57) ABSTRACT

The present invention relates to a road paving method enabling one to provide an asphalt paving material layer in which both excellent stability and stress relaxation can be made compatible with each other, the method including Step 1: a step of mixing asphalt, a thermoplastic elastomer, a polyester, and an aggregate to obtain an asphalt mixture, and Step 2: a step of laying the asphalt mixture obtained in Step 1 on a road, thereby forming an asphalt paving material layer, wherein the polyester has a softening point of 90° C. or higher and 140° C. or lower and a glass transition point of 40° C. or higher and 80° C. or lower, and a ratio of the polyester is more than 17 parts by mass and 50 parts by mass or less based on 100 parts by mass of the asphalt.

4 Claims, No Drawings

(56) References Cited

FOREIGN PATENT DOCUMENTS

| | | |
|---|---|---|
| EP | 3 405 525 B1 | 11/2019 |
| EP | 3 656 821 A1 | 5/2020 |
| JP | 4-8766 A | 1/1992 |
| JP | 6-116500 A | 4/1994 |
| JP | 9-227190 A | 9/1997 |
| JP | 2000-169208 A | 6/2000 |
| JP | 2001-72862 A | 3/2001 |
| JP | 2005-126998 A | 5/2005 |
| JP | 2005-307218 A | 11/2005 |
| JP | 2006-124460 A | 5/2006 |
| JP | 2008-223463 A | 9/2008 |
| JP | 2013-222044 A | 10/2013 |
| JP | 2015-227025 A | 12/2015 |
| JP | 2019-508608 A | 3/2019 |
| JP | 2020-117702 A | 8/2020 |
| KR | 10-1647298 B1 | 8/2016 |
| WO | WO 96/23010 A2 | 8/1996 |
| WO | WO 2007/068990 A1 | 6/2007 |
| WO | WO 2013/152113 A1 | 10/2013 |
| WO | WO 2017/125421 A1 | 7/2017 |
| WO | WO 2018/003151 A1 | 1/2018 |
| WO | WO 2018/037771 A1 | 3/2018 |
| WO | WO 2018/134921 A1 | 7/2018 |

OTHER PUBLICATIONS

Extended European Search Report, dated Oct. 9, 2020, for European Application No. 18835024.3.
Ge et al., "Properties of plastic mortar made with recycled polyethylene terephthalate," Construction and Building Materials, vol. 73, 2014 (published online Oct. 27, 2014), pp. 682-687.
International Search Report for International Application No. PCT/JP2018/026719, dated Oct. 9, 2018, with English translation.
Modarres et al., "Effect of waste plastic bottles on the stiffness and fatigue properties of modified asphalt mixes," Materials and Design, vol. 51, 2014 (published online Apr. 29, 2014), pp. 8-15.
U.S. Appl. No. 16/630,992, filed Jan. 14, 2020.
Extended European Search Report for European Application No. 18834907.0, dated Feb. 26, 2021.
Moghaddam et al., "Properties of SMA Mixtures Containing Waste Polyethylene Terephthalate," International Journal of Chemical and Biological Engineering, vol. 6, 2012, pp. 188-191, XP055282643.
International Search Report (PCT/ISA/210) issued in PCT/JP2018/026720, dated Sep. 25, 2018.

* cited by examiner

ROAD PAVING METHOD

FIELD OF THE INVENTION

The present invention relates to a road paving method.

BACKGROUND OF THE INVENTION

An asphalt pavement using an asphalt mixture has been frequently performed for paving driveways, parking spaces, cargo yards, sidewalks, etc., because of relatively easy construction and a short period of time from beginning of paving works to traffic start.

This asphalt pavement includes a road surface which is formed of an asphalt mixture containing aggregates bonded with each other through asphalt, and hence, paved roads exhibit good hardness and good durability.

However, a rut of a wheel or a crack is generated on the asphalt pavement surface due to long-term use. Therefore, in such a case, repair of the pavement is inevitably needed, which results in increased maintenance costs and significant influence on car traffic.

PTL 1 describes a waste toner-containing paving material containing 100 parts by weight of asphalt and 1 to 10 parts by weight of a waste toner. In PTL 1, it is described that according to the foregoing paving material, by blending a toner that is a waste, not only a paving material which is excellent in flow resistance, abrasion resistance, and crack resistance is provided, but also the waste toner which has hitherto been discarded as an industrial waste is reutilized.

CITATION LIST

Patent Literature

PTL 1: JP 2000-169208 A

SUMMARY OF THE INVENTION

An embodiment of the present invention relates to a road paving method including Step 1: a step of mixing asphalt, a thermoplastic elastomer, a polyester, and an aggregate to obtain an asphalt mixture, and Step 2: a step of laying the asphalt mixture obtained in Step 1 on a road, thereby forming an asphalt paving material layer, wherein the polyester has a softening point of 90° C. or higher and 140° C. or lower and a glass transition point of 40° C. or higher and 80° C. or lower, and a ratio of the polyester is more than 17 parts by mass and 50 parts by mass or less based on 100 parts by mass of the asphalt.

DETAILED DESCRIPTION OF THE INVENTION

In the case of performing the pavement by the method described in PTL 1 as the conventional method, when a very high load is applied onto the road surface, such as an occasion when a large-weight vehicle passes therethrough, there was involved such a problem that a damage appears in a part of the road surface. Then, as the road paving method, there is demanded a method capable of forming a paved surface which exhibits excellent stability such that it is not destroyed even when a higher additional load is applied at the high-temperature time, is further excellent in elasticity, and is also excellent in stress relaxation such that a crack is hardly formed.

Then, the embodiment of the present invention is to provide a road paving method enabling one to provide an asphalt paving material layer in which both excellent stability and stress relaxation are made compatible with each other.

The embodiment of the present invention is as described above.

In accordance with the present invention, it is possible to provide a road paving method enabling one to provide an asphalt paving material layer in which both excellent stability and stress relaxation are made compatible with each other.

[Road Paving Method]

The road paving method according to the present invention is concerned with a road paving method including Step 1: a step of mixing asphalt, a thermoplastic elastomer, a polyester, and an aggregate to obtain an asphalt mixture, and Step 2: a step of laying the asphalt mixture obtained in Step 1 on a road, thereby forming an asphalt paving material layer, wherein the polyester has a softening point of 90° C. or higher and 140° C. or lower and a glass transition point of 40° C. or higher and 80° C. or lower, and a ratio of the polyester is more than 17 parts by mass and 50 parts by mass or less based on 100 parts by mass of the asphalt.

In accordance with the present invention, it is possible to provide a road paving method enabling one to provide an asphalt paving material layer in which both excellent stability and stress relaxation are made compatible with each other.

Although the reason for this is not always elucidated yet, the following may be considered.

It may be considered that in view of the fact that the polyester has a softening point equal to or higher than a predetermined value and a glass transition point equal to or higher than a predetermined value, not only it exhibits a high intermolecular force (van der Waals force) to undergo an intermolecular interaction with the thermoplastic elastomer that is an asphalt-modifying component, but also it adsorbs on the aggregate.

Then, it may be considered that in view of the fact that the polyester has a softening point in a range of equal to or lower than a predetermined value and a glass transition point in a range of equal to or lower than a predetermined value, the resin with high polarity adsorbs on the aggregate while remaining stress relaxation of a pavement (toughness against crack resistance) in order to remain flexibility of the thermoplastic elastomer, to anchor the aggregate, so that the stability is improved, too.

Definitions and so on regarding various terminologies in this specification are hereunder described.

A "binder mixture" means a mixture of asphalt and a thermoplastic elastomer, and for example, it has a concept including modified asphalt with a thermoplastic elastomer as mentioned later.

In the polyester, an "alcohol component-derived structural unit" means a structure resulting from eliminating a hydrogen atom from a hydroxy group of the alcohol component, and a "carboxylic acid component-derived structural unit" means a structure resulting from eliminating a hydroxy group from a carboxy group of the carboxylic acid component.

A "carboxylic acid compound" has a concept including not only a carboxylic acid thereof but also an anhydride which is decomposed during the reaction to form an acid and an alkyl ester of carboxylic acid (for example, the carbon number of the alkyl group is 1 or more and 3 or less).

In the case where the carboxylic acid compound is an alkyl ester of carboxylic acid, the carbon number of the alkyl group that is an alcohol residue of the ester is not calculated for the carbon number of the carboxylic acid compound.

The respective steps and so on of the production method according to the embodiment of the present invention are hereunder described.

[Step 1]

Step 1 is a step of mixing asphalt, a thermoplastic elastomer, a polyester, and an aggregate to obtain an asphalt mixture.

<Asphalt>

As the asphalt, for example, various kinds of asphalts can be used. Examples thereof include in addition to straight asphalt that is petroleum asphalt for pavement, blown asphalt.

The straight asphalt refers to a residual bituminous material obtained by treating a crude oil with an atmospheric distillation apparatus, a vacuum distillation apparatus, or the like.

The blown asphalt means asphalt obtained by heating a mixture of straight asphalt and a heavy oil and then blowing air to undergo oxidation.

Of these, from the viewpoint of versatility, straight asphalt is preferred.

A penetration of the asphalt is preferably more than 40, and it is preferably 120 or less, more preferably 80 or less, and still more preferably 60 or less. A measurement method of the penetration conforms to the method prescribed in JIS K2207:2006. When a prescribed needle penetrates vertically into a sample under a test condition described in JIS K2207: 2006, 0.1 mm of a length of the needle penetrated into the sample is expressed as 1.

In Step 1, the amount of the asphalt is preferably 67% by mass or more, more preferably 70% by mass or more, still more preferably 73% by mass or more, and yet still more preferably 75% by mass or more, and it is preferably 85% by mass or less, and more preferably 83% by mass or less, relative to the total amount of the asphalt, the thermoplastic elastomer, and the polyester.

<Thermoplastic Elastomer>

Examples of the thermoplastic elastomer include a styrene/butadiene block copolymer (hereinafter also referred to simply as "SB"), a styrene/butadiene/styrene block copolymer (hereinafter also referred to simply as "SBS"), a styrene/butadiene random copolymer (hereinafter also referred to simply as "SBR"), a styrene/isoprene block copolymer (hereinafter also referred to simply as "SI"), a styrene/isoprene/styrene block copolymer (hereinafter also referred to simply as "SIS"), a styrene/isoprene random copolymer (hereinafter also referred to simply as "SIR"), an ethylene/vinyl acetate copolymer, and an ethylene/acrylic acid ester copolymer. Examples of a commercially available product of the ethylene/acrylic acid ester copolymer include "Elvaroy" (manufactured by DuPont de Nemours, Inc.).

Of these thermoplastic elastomers, a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer are preferred; and a styrene/butadiene/styrene block copolymer and a styrene/butadiene random copolymer are more preferred.

In Step 1, the amount of the thermoplastic elastomer is preferably 0.5% by mass or more, more preferably 1% by mass or more, and still more preferably 1.5% by mass or more, and it is preferably 30% by mass or less, more preferably 20% by mass or less, still more preferably 10% by mass or less, and yet still more preferably 7% by mass or less, relative to the total amount of the asphalt, the thermoplastic elastomer, and the polyester.

In Step 1, a ratio of the thermoplastic elastomer is preferably 0.1 parts by mass or more, more preferably 0.5 parts by mass or more, still more preferably 1 part by mass or more, and yet still more preferably 2 parts by mass or more, and it is preferably 30 parts by mass or less, more preferably 20 parts by mass or less, still more preferably 10 parts by mass or less, and yet still more preferably 5 parts by mass or less, based on 100 parts by mass of the asphalt.

It is preferred that the asphalt and the thermoplastic elastomer are used as a binder mixture that is a mixture of these materials. Examples of the binder mixture include straight asphalt that is modified asphalt (the straight asphalt will be hereinafter also referred to as "modified asphalt").

<Polyester>

From the viewpoint of making both excellent stability and stress relaxation compatible with each other, the polyester has a softening point of 90° C. or higher and 140° C. or lower and a glass transition point of 40° C. or higher and 80° C. or lower.

From the viewpoint of undergoing an intermolecular interaction with the thermoplastic elastomer and more improving the stability and the stress relaxation, the polyester preferably contains an alcohol component-derived structural unit containing 60 mol % or more of an alkylene oxide adduct of bisphenol A and a carboxylic acid component-derived structural unit; and more preferably contains an alcohol component-derived structural unit containing 60 mol % or more of an alkylene oxide adduct of bisphenol A and a carboxylic acid component-derived structural unit containing 50 mol % or more of at least one selected from the group consisting of terephthalic acid and isophthalic acid.

(Alcohol Component)

Examples of the alcohol component include aliphatic diols, aromatic diols, and trihydric or higher-hydric and octahydric or lower-hydric alcohols. These alcohol components can be used alone or in combination of two or more thereof.

From the viewpoint of making both excellent stability and stress relaxation of the asphalt paving material layer compatible with each other, the alcohol component preferably contains an alkylene oxide adduct of bisphenol A, and more preferably contains an alkylene oxide adduct of bisphenol A represented by the following formula (I):

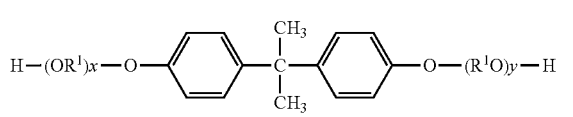

wherein $OR^1$ and $R^1O$ each represent an alkylene oxide; $R^1$ represents an alkylene group having 2 or 3 carbon atoms; x and y each represent a positive number expressing an average addition molar number of the alkylene oxide; and a sum total of x and y is 1 or more, and preferably 1.5 or more, and it is 16 or less, preferably 8 or less, and more preferably 4 or less.

It may be considered that in view of the fact that the polyester contains an alcohol component-derived structural unit containing 60 mol % or more of an alkylene oxide adduct of bisphenol A, the polyester not only undergoes an intermolecular interaction with the thermoplastic elastomer that is an asphalt-modifying component but also adsorbs on the aggregate. According to this, it may be considered that the resin with high rigidity adsorbs on the aggregate while remaining stress relaxation of a pavement (toughness against crack resistance) in order to remain flexibility of the thermoplastic elastomer, to anchor the aggregate, so that the stability is improved, too. In particular, among thermoplastic elastomers, SBS and SBR as mentioned later readily reveal this effect.

Examples of the alkylene oxide adduct of bisphenol A represented by the formula (I) include a propylene oxide adduct of 2,2-bis(4-hydroxyphenyl)propane (hereinafter also referred to simply as "BPA") and an ethylene oxide adduct of BPA. Of these, a combination of a propylene oxide adduct of BPA and an ethylene oxide adduct of BPA is preferred.

From the viewpoint of making both excellent stability and stress relaxation compatible with each other due to the intermolecular interaction with the thermoplastic elastomer, the amount of the alkylene oxide adduct of bisphenol A in the alcohol component is preferably 65 mol % or more, and more preferably 80 mol % or more, and it is 100 mol % or less.

From the viewpoint of making both excellent stability and stress relaxation compatible with each other due to the intermolecular interaction with the thermoplastic elastomer, a molar ratio of the propylene oxide adduct of bisphenol A to the ethylene oxide adduct of bisphenol A in the alcohol component is preferably 5/95 or more, and more preferably 10/90 or more, and it is preferably 50/50 or less, more preferably 40/60 or less, and still more preferably 30/70 or less.

The aliphatic diol is, for example, an aliphatic diol having 2 or more and 20 or less carbon atoms. Examples of the aliphatic diol include ethylene glycol, 1,2-propanediol, 1,3-propanediol, 1,4-butanediol, 1,5-pentanediol, 1,6-hexanediol, 1,4-butenediol, 1,3-butanediol, neopentyl glycol, 1,10-decanediol, and 1,12-dodecanediol.

The trihydric or higher-hydric alcohol is, for example, a trihydric alcohol. Examples of the trihydric or higher-hydric alcohol include glycerin.

(Carboxylic Acid Component)

Examples of the carboxylic acid component include aromatic dicarboxylic acid compounds, aliphatic dicarboxylic acid compounds, trivalent or higher-valent and hexavalent or lower-valent carboxylic acid compounds. These carboxylic acid components can be used alone or in combination of two or more thereof.

Examples of the aromatic dicarboxylic acid compound include phthalic acid, isophthalic acid, terephthalic acid, and naphthalenedicarboxylic acid, and anhydrides or alkyl esters (for example, the carbon number of the alkyl group is 1 or more and 3 or less) thereof.

From the viewpoint of making both excellent stability and stress relaxation compatible with each other, the carboxylic acid component contains at least one selected from the group consisting of terephthalic acid and isophthalic acid, and preferably contains terephthalic acid.

From the viewpoint of making both excellent stability and stress relaxation compatible with each other, the amount of the at least one selected from the group consisting of terephthalic acid and isophthalic acid in the carboxylic acid component is 50 mol % or more, preferably 60 mol % or more, still more preferably 70 mol % or more, and yet still more preferably 75 mol % or more, and it is preferably 99 mol % or less, more preferably 95 mol % or less, and still more preferably 90 mol % or less.

From the viewpoint of making both excellent stability and stress relaxation compatible with each other, the carbon number of the aliphatic dicarboxylic acid is preferably 3 or more, and more preferably 4 or more, and it is preferably 10 or less, and more preferably 8 or less.

Examples of the aliphatic dicarboxylic acid compound include fumaric acid, maleic acid, oxalic acid, malonic acid, citraconic acid, itaconic acid, glutaconic acid, succinic acid, adipic acid, suberic acid, azelaic acid, sebacic acid, and dodecane diacid.

Of the foregoing aliphatic dicarboxylic acid compounds, from the viewpoint of making both excellent stability and stress relaxation compatible with each other, saturated or unsaturated dicarboxylic acids having 4 or more and 8 or less carbon atoms are preferred; fumaric acid, maleic acid, and adipic acid are more preferred; and adipic acid is still more preferred.

From the viewpoint of making both excellent stability and stress relaxation compatible with each other, the content of the aliphatic dicarboxylic acid compound based on the carboxylic acid component is preferably 1 mol % or more, more preferably 5 mol % or more, and still more preferably 10 mol % or more, and it is preferably 30 mol % or less, and more preferably 25 mol % or less.

The trivalent or higher-valent and hexavalent or lower-valent carboxylic acid compound is preferably a trivalent carboxylic acid.

Examples of the trivalent or higher-valent and hexavalent or lower-valent carboxylic acid compound include trimellitic acid, 2,5,7-naphthalenetricarboxylic acid, and pyromellitic acid.

From the viewpoint of controlling physical properties, a monohydric alcohol may be appropriately contained in the alcohol component, and a monovalent carboxylic acid compound may be appropriately contained in the carboxylic acid component.

<Molar Ratio of Carboxylic Acid Component-Derived Structural Unit to Alcohol Component-Derived Structural Unit>

From the viewpoint of controlling an acid value, a molar ratio of the carboxylic acid component-derived structural unit to the alcohol component-derived structural unit [(carboxylic acid component)/(alcohol component)] is preferably 0.7 or more, and more preferably 0.8 or more, and it is preferably 1.5 or less, more preferably 1.3 or less, and still more preferably 1.1 or less.

<Physical Properties of Polyester>

From the viewpoint of revealing excellent stability, a hydroxyl value of the polyester is preferably 1 mgKOH/g or more, more preferably 5 mgKOH/g or more, still more preferably 8 mgKOH/g or more, yet still more preferably 10 mgKOH/g or more, and even yet still more preferably 13 mgKOH/g or more, and it is preferably 35 mgKOH/g or less, more preferably 30 mgKOH/g or less, still more preferably 25 mgKOH/g or less, yet still more preferably 20 mgKOH/g or less, and even yet still more preferably 14 mgKOH/g or less.

From the viewpoint of promoting the absorption onto the aggregate and more improving the stability of the asphalt paving material layer, an acid value of the polyester is preferably 1 mgKOH/g or more, more preferably 2 mgKOH/g or more, still more preferably 3 mgKOH/g or more, yet still more preferably 5 mgKOH/g or more, even yet still more preferably 10 mgKOH/g or more, and even still more preferably 12 mgKOH/g or more, and from the viewpoint of enhancing the water resistance of the pavement, the acid value of the polyester is preferably 30 mgKOH/g or less, more preferably 20 mgKOH/g or less, and still more preferably 18 mgKOH/g or less.

From the viewpoint of revealing excellent stability, the softening point of the polyester is 90° C. or higher, preferably 95° C. or higher, and more preferably 100° C. or higher, and it is preferably 140° C. or lower, more preferably 125° C. or lower, still more preferably 115° C. or lower, yet still more preferably 108° C. or lower, and even yet still more preferably 105° C. or lower.

From the viewpoint of making both excellent stability and stress relaxation compatible with each other and the viewpoint of more improving the stability of the asphalt paving material layer at a high temperature, the glass transition point of the polyester is 40° C. or higher, preferably 45° C. or higher, more preferably 50° C. or higher, and still more preferably 55° C. or higher, and from the viewpoint of making both excellent stability and stress relaxation compatible with each other and viewpoint of not only enhancing the solubility of the polyester in the plant mix but also smoothly undergoing the rolling compaction during laying, the glass transition point of the polyester is 80° C. or lower, preferably 70° C. or lower, and more preferably 60° C. or lower.

The acid value, the hydroxyl value, the softening point, and the glass transition point can be measured by the methods described in the section of Examples. The acid value, the hydroxyl value, the softening point, and the glass transition point can be controlled according to a raw material monomer composition, a molecular weight, a catalyst amount, or a reaction condition.

<Production Method of Polyester>

Although a method for producing the polyester is not particularly limited, for example, the polyester can be produced by subjecting the alcohol component and the carboxylic acid component as mentioned above to polycondensation.

Although a temperature of the polycondensation reaction is not particularly limited, it is preferably 160° C. or higher and 260° C. or lower from the viewpoint of reactivity.

For the polycondensation reaction, a tin(II) compound not having an Sn—C bond, such as tin(II) di(2-ethylhexanoate), may be used as a catalyst in an amount of preferably 0.01 parts by mass or more, and more preferably 0.2 parts by mass or more, and preferably 1.5 parts by mass or less, and more preferably 0.6 parts by mass or less, based on 100 parts by mass of a total amount of the alcohol component and the carboxylic acid component.

For the polycondensation reaction, in addition to the catalyst, a pyrogallol compound, such as gallic acid, may be used as an esterification catalyst in an amount of preferably 0.001 parts by mass or more, more preferably 0.005 parts by mass or more, and still more preferably 0.01 parts by mass or more, and preferably 0.15 parts by mass or less, more preferably 0.10 parts by mass or less, and still more preferably 0.05 parts by mass or less, based on 100 parts by mass of a total amount of the alcohol component and the carboxylic acid component.

<Ratio of Polyester>

From the viewpoint of making both excellent stability and stress relaxation compatible with each other, a ratio of the polyester is more than 17 parts by mass, preferably 20 parts by mass or more, and more preferably 24 parts by mass or more, and it is 50 parts by mass or less, preferably 40 parts by mass or less, and more preferably 30 parts by mass or less, based on 100 parts by mass of the asphalt.

The composition containing the asphalt, the thermoplastic elastomer, and the polyester as mentioned above is occasionally referred to as the asphalt composition.

Namely, the asphalt composition according to the embodiment of the present invention is one containing asphalt, a thermoplastic elastomer, and a polyester, wherein the polyester has a softening point of 90° C. or higher and 140° C. or lower and a glass transition point of 40° C. or higher and 80° C. or lower, and a ratio of the polyester is more than 17 parts by mass and 50 parts by mass or less based on 100 parts by mass of the asphalt.

By using the asphalt composition upon being mixed with an aggregate as mentioned later, an asphalt paving material layer in which both excellent stability and stress relaxation are made compatible with each other is obtained.

With respect to the asphalt composition, suitable modes of the asphalt, the thermoplastic elastomer, and the polyester are those as mentioned above.

<Aggregate>

The aggregate can be, for example, optionally selected from crushed stone, cobble stone, gravel, sand, reclaimed aggregate, and ceramics, and used.

As the aggregate, all of a coarse aggregate having a particle diameter of 2.36 mm or more and a fine aggregate having a particle diameter of less than 2.36 mm can be used.

Examples of the coarse aggregate include crushed stone having a particle diameter range of 2.36 mm or more and 4.75 mm or less, crushed stone having a particle diameter range of 4.75 mm or more and 12.5 mm or less, crushed stone having a particle diameter range of 12.5 mm or more and 19 mm or less, and crushed stone having a particle diameter range of 19 mm or more and 31.5 mm or less.

The fine aggregate is preferably a fine aggregate having a particle diameter of 0.075 mm or more and less than 2.36 mm. Examples of the fine aggregate include river sand, hill sand, mountain sand, sea sand, crushed sand, fine sand, screenings, crushed stone dust, silica sand, artificial sand, glass cullet, molding sand, and reclaimed aggregate-crushed sand.

The aforementioned particle diameter is a value prescribed in JIS 5001:1995.

Of these, a combination of the coarse aggregate and the fine aggregate is preferred.

The fine aggregate may contain a filler having a particle diameter of less than 0.075 mm (for example, sand). A lower limit value of the average particle diameter of the filler is, for example, 0.001 mm or more.

The average particle diameter of the filler is preferably 0.001 mm or more, and it is preferably 0.05 mm or less, more preferably 0.03 mm or less, and still more preferably 0.02 mm or less. The average particle diameter of the filler can be measured by a laser diffraction particle size distribution analyzer. Here, the average particle diameter means an average particle diameter of 50% cumulative volume.

[Measurement Method of Average Particle Diameter of Filler]

The average particle diameter of the filler is a value measured by a laser diffraction particle size distribution analyzer (LA-950, manufactured by HORIBA, Ltd.) under the following condition.
Measurement method: Flow method
Dispersion medium: Ethanol
Sample preparation: 2 mg/100 mL
Dispersing method: Stirring and 1 minute of built-in ultrasonic waves Examples of the filler include sand, fly ash, calcium carbonate, and hydrated lime. Of these, calcium carbonate is preferred.

A mass ratio of the coarse aggregate to the fine aggregate is preferably 10/90 or more, more preferably 20/80 or more, and still more preferably 30/70 or more, and it is preferably 90/10 or less, more preferably 80/20 or less, and still more preferably 70/30 or less.

The content of the aggregate is preferably 800 parts by mass or more, more preferably 900 parts by mass or more, and still more preferably 1,000 parts by mass or more, and it is preferably 2,500 parts by mass or less, more preferably 2,000 parts by mass or less, and still more preferably 1,500 parts by mass or less, based on 100 parts by mass of a sum total of the asphalt, the thermoplastic elastomer, and the polyester.

<Asphalt Mixture>

The asphalt mixture contains the asphalt, the thermoplastic elastomer, the polyester, and the aggregate as mentioned above. In accordance with the foregoing asphalt mixture, an asphalt paving material layer in which both excellent stability and stress relaxation are made compatible with each other is provided.

The total content of the asphalt, the thermoplastic elastomer, and the polyester in the asphalt mixture is preferably 2% by mass or more, more preferably 3% by mass or more, and still more preferably 4% by mass or more, and it is preferably 15% by mass or less, more preferably 10% by mass or less, and still more preferably 9% by mass or less.

Suitable blending examples of the asphalt mixture are as follows.

(1) An example of the asphalt mixture includes, for example, 30% by volume or more and less than 45% by volume of the coarse aggregate, 30% by volume or more and 50% by volume or less of the fine aggregate, and 5% by volume or more and 10% by volume or less of the asphalt, the thermoplastic elastomer, and the polyester (fine-graded asphalt).

(2) An example of the asphalt mixture includes, for example, 45% by volume or more and less than 70% by volume of the coarse aggregate, 20% by volume or more and 45% by volume or less of the fine aggregate, and 3% by volume or more and 10% by volume or less of the asphalt, the thermoplastic elastomer, and the polyester (dense-graded asphalt).

(3) An example of the asphalt mixture includes, for example, 70% by volume or more and 80% by volume or less of the coarse aggregate, 10% by volume or more and 20% by volume or less of the fine aggregate, and 3% by volume or more and 10% by volume or less of the asphalt, the thermoplastic elastomer, and the polyester (porous asphalt).

In the asphalt mixture, other components may be further blended, as the need arises.

The blending ratio of the asphalt in the conventional asphalt mixtures containing the aggregate and the asphalt is in general determined by referring to an optimum asphalt amount obtained from "Formulation and Design of Asphalt Mixture" as described in "Guideline for Pavement Design and Construction" published by Japan Road Association.

In this specification, the aforementioned optimum asphalt amount corresponds to the total amount of the asphalt, the thermoplastic elastomer, and the polyester. In consequence, in general, the total blending amount of the asphalt, the thermoplastic elastomer, and the polyester is preferably determined from the aforementioned optimum asphalt amount.

However, it is not needed to limit the optimum asphalt amount to the method as described in "Guideline for Pavement Design and Construction", and it may also be determined by any other methods.

<Condition of Step 1>

In Step 1, the mixing method of the asphalt, the thermoplastic elastomer, the polyester, and the aggregate is not particularly limited, and the asphalt mixture may be produced by any methods, and in general, the mixing method may be performed according to a method for producing an asphalt mixture containing an aggregate and asphalt.

The asphalt, the thermoplastic elastomer, and the polyester may be previously mixed before adding the aggregate.

In mixing the asphalt, the thermoplastic elastomer, and the polyester, a temperature at which the asphalt, the thermoplastic elastomer, and the polyester are mixed is preferably 130° C. or higher, and more preferably 150° C. or higher, and it is preferably 230° C. or lower, and more preferably 200° C. or lower.

A stirring rate at the time of mixing is preferably 100 rpm or more, and more preferably 200 rpm or more, and it is preferably 1,000 rpm or less, and more preferably 800 rpm or less.

Step 1 is preferably a step of mixing the heated aggregate with the asphalt, the thermoplastic elastomer, and the polyester as mentioned above.

As the specific production method, there is exemplified the conventional production method of an asphalt mixture which is called a plant mix method, a premix method, or the like. All of these methods are concerned with a method for adding the asphalt, the thermoplastic elastomer, and the polyester to the heated aggregate. From the viewpoint of making both a Marshall stability that is an index of strength of a specimen and a flow value that is an index of toughness of a specimen compatible with each other, examples of the addition method include a premix method in which the asphalt, the thermoplastic elastomer, and the polyester are previously dissolved; and a plant mix method in which modified asphalt having the thermoplastic elastomer dissolved in the asphalt is added, and then, the polyester is charged. Of these, the plant mix method is preferred.

More specifically, in the production method of the asphalt mixture, the mixing step is preferably (i) a method in which the asphalt and the thermoplastic elastomer are added to and mixed with the heated aggregate, and then, the polyester is added and mixed; or (ii) a method in which the asphalt, the thermoplastic elastomer, and the polyester are simultaneously added to and mixed with the heated aggregate.

Of these, the method (i) is preferred.

In Step 1, from the viewpoint of making both excellent stability and stress relaxation of the asphalt paving material layer compatible with each other, a temperature of the heated aggregate is preferably a temperature higher than the softening point of the polyester. The temperature of the heated aggregate is preferably 130° C. or higher, more preferably 150° C. or higher, and still more preferably 170° C. or higher, and it is preferably 230° C. or lower, more preferably 210° C. or less, and still more preferably 200° C. or lower.

In Step 1, a mixing temperature is preferably a temperature higher than the softening point of the polyester. The mixing temperature is preferably 130° C. or higher, more preferably 150° C. or higher, still more preferably 170° C. or higher, and yet still more preferably 175° C. or higher, and it is preferably 230° C. or lower, more preferably 210° C. or lower, and still more preferably 200° C. or lower.

In Step 1, a mixing time is, for example, 30 seconds or more, preferably 1 minute or more, more preferably 2 minutes or more, and still more preferably 5 minutes or more. Although an upper limit of the time is not particularly limited, it is, for example, about 30 minutes.

In Step 1, from the viewpoint of making both excellent stability and stress relaxation of the asphalt paving material layer compatible with each other, after the aforementioned mixing, it is preferred to provide a step of holding the resulting mixture at a temperature equal to or higher than the softening point of the polyester.

In the holding step, though the mixture may be further mixed, the mixture may be held at a temperature equal to or higher than the aforementioned temperature.

In the holding step, the mixing temperature is preferably a temperature higher than the softening point of the polyester, more preferably 130° C. or higher, still more preferably 150° C. or higher, yet still more preferably 170° C. or higher, and even yet still more preferably 175° C. or higher, and it is preferably 230° C. or lower, more preferably 210° C. or lower, and still more preferably 200° C. or lower.

A holding time in the holding step is preferably 0.5 hours or more, more preferably 1 hour or more, and still more preferably 1.5 hours or more. Although an upper limit of the time is not particularly limited, it is, for example, about 5 hours.

[Step 2]

Step 2 is a step of laying the asphalt mixture obtained in Step 1 on a road, thereby forming an asphalt paving material layer.

The asphalt paving material layer is preferably a base layer or a surface layer.

The asphalt mixture may be subjected to compacting laying using the same laying machines and the same laying method as used for ordinary asphalt mixtures. In the case of using the asphalt mixture as the heated asphalt mixture, a compacting temperature thereof is preferably a temperature higher than the softening point of the polyester. The compacting temperature is preferably 100° C. or higher, more preferably 120° C. or higher, and still more preferably 130° C. or higher, and it is preferably 200° C. or lower, and more preferably 180° C. or lower.

With respect to the aforementioned embodiments, the specification further discloses the following paving method, asphalt composition, asphalt mixture, and so on. It should be construed that it is possible to replace the terms "containing" and "including" by "comprising".

<1> A road paving method including
Step 1: a step of mixing asphalt, a thermoplastic elastomer, a polyester, and an aggregate to obtain an asphalt mixture, and
Step 2: a step of laying the asphalt mixture obtained in Step 1 on a road, thereby forming an asphalt paving material layer, wherein
the polyester has a softening point of 90° C. or higher and 140° C. or lower and a glass transition point of 40° C. or higher and 80° C. or lower, and
a ratio of the polyester is more than 17 parts by mass and 50 parts by mass or less based on 100 parts by mass of the asphalt.

<2> The road paving method as set forth in <1>, wherein the polyester contains an alcohol component-derived structural unit containing 60 mol % or more of an alkylene oxide adduct of bisphenol A and a carboxylic acid component-derived structural unit.

<3> The road paving method as set forth in <1> or <2>, wherein the polyester has a hydroxyl value of 1 mgKOH/g or more and 35 mgKOH/g or less.

<4> The road paving method as set forth in any of <1> to <3>, wherein the polyester contains an alcohol component-derived structural unit containing 60 mol % or more of an alkylene oxide adduct of bisphenol A and a carboxylic acid component-derived structural unit containing 50 mol % or more of at least one selected from the group consisting of terephthalic acid and isophthalic acid.

<5> The road paving method as set forth in any of <1> to <4>, wherein the polyester contains 50 mol % or more of an aromatic dicarboxylic acid compound based on the carboxylic acid component.

<6> The road paving method as set forth in any of <1> to <5>, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, a styrene/isoprene random copolymer, an ethylene/vinyl acetate copolymer, and an ethylene/acrylic acid ester copolymer.

<7> The road paving method as set forth in any of <1> to <6>, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer.

<8> An asphalt composition containing asphalt, a thermoplastic elastomer, and a polyester, wherein
the polyester has a softening point of 90° C. or higher and 140° C. or lower and a glass transition point of 40° C. or higher and 80° C. or lower, and
a ratio of the polyester is more than 17 parts by mass and 50 parts by mass or less based on 100 parts by mass of the asphalt.

<9> The asphalt composition as set forth in <8>, wherein the polyester contains an alcohol component-derived structural unit containing 60 mol % or more of an alkylene oxide adduct of bisphenol A and a carboxylic acid component-derived structural unit.

<10> The asphalt composition as set forth in <9>, wherein the polyester contains 50 mol % or more of an aromatic dicarboxylic acid compound based on the carboxylic acid component.

<11> The asphalt composition as set forth in <9>, wherein the polyester contains 50 mol % or more of an aliphatic dicarboxylic acid compound based on the carboxylic acid component.

<12> The asphalt composition as set forth in any of <8> to <11>, wherein the polyester has a hydroxyl value of 1 mgKOH/g or more and 70 mgKOH/g or less.

<13> The asphalt composition as set forth in any of <8> to <12>, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, a styrene/isoprene random copolymer, an ethylene/vinyl acetate copolymer, and an ethylene/acrylic acid ester copolymer.

<14> The asphalt composition as set forth in any of <8> to <13>, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer.

<15> An asphalt mixture including the asphalt composition as set forth in any of <8> to <14> and an aggregate.

<16> Use of the asphalt composition as set forth in any of <8> to <14> for road pavement.

<17> Use of the asphalt mixture as set forth in <15> for road pavement.

EXAMPLES

Respective physical values of resins and the like were measured and evaluated by the following methods.

[Measurement Method]
[Acid Value and Hydroxyl Value of Polyester Resin]

An acid value and a hydroxyl value of a polyester resin were each measured on the basis of the method of JIS K0070:1992. However, only the measuring solvent was changed from a mixed solvent of ethanol and ether as prescribed in JIS K0070:1992 to a mixed solvent of acetone and toluene (acetone/toluene=1/1 (volume ratio)).

[Softening Point and Glass Transition Point of Polyester]
(1) Softening Point

Using a flow tester "CFT-500D" (manufactured by Shimadzu Corporation), while heating 1 g of a sample at a temperature rise rate of 6° C./min, a load of 1.96 MPa was applied by a plunger, and the sample was extruded through a nozzle having a diameter of 1 mm and a length of 1 mm. The amount of descent of the plunger of the flow tester versus the temperature was plotted, and a temperature at which a half amount of the sample flowed out was defined as the softening point of the sample.

(2) Glass Transition Point

Using a differential scanning calorimeter "Q-100" (manufactured by TA Instruments Japan Inc.), 0.01 to 0.02 g of a sample was weighed in an aluminum pan, subjected to temperature rise to 200° C., and then cooled from that temperature to 0° C. at a temperature drop rate of 10° C./min. Subsequently, a differential scanning calorie of the resulting sample was measured while raising the temperature to 150° C. at a temperature rise rate of 10° C./min. A temperature at which an extension of a baseline of not higher than the maximum endothermic peak temperature was intersected with a tangential line having a maximum inclination of the curve in a region of from a rise-up portion of the peak to an apex of the peak was read as the glass transition point of the sample.

[Evaluation]
[Marshall Stability and Marshall Flow Value]

Using a Marshall tester "Model No.-504" (manufactured by Nakajima Technology Inc.), the side face of a cylindrical asphalt paving material layer specimen having a diameter of 100 mm and a thickness of about 63 mm was interposed between two sheets of arc-shaped loading plates, and a load was applied at a temperature of the specimen of 60° C. at a rate of loading of 50 mm/min from the diameter direction until it was destroyed. A maximum load expressed until reaching destroy was defined as the Marshall stability, and a deformation amount corresponding thereto was defined as the Marshall flow value. It is meant that the larger the value of the Marshal stability, the more excellent the stability is, and that the lager the value of the Marshall flow value corresponding thereto, the more excellent the stress relaxation is.

[Production of Polyester]

Production Examples 1, 2, and 5

Resins A-1, A-2, and A-5

In a 5 liter-volume four-necked flask equipped with a thermometer, a stainless steel-made stirring rod, a flow-down type condenser, and a nitrogen inlet tube, an alcohol component and terephthalic acid for a resin, which are shown in Table 1, were charged, and 20 g of tin(II) di(2-ethylhexanoate) and 2 g of gallic acid were added in a nitrogen atmosphere. The temperature was raised to 235° C. over 3 hours in a mantle heater, and after the temperature reached 235° C., the contents were held for 7 hours. Then, the reaction was performed under reduced pressure at 8.0 kPa for 1 hour. Thereafter, the resultant was cooled to 180° C., adipic acid was charged, and the temperature was then raised to 210° C. over 2 hours. The temperature was held at 210° C. for 1 hour, and the reaction was further performed under reduced pressure at 8.0 kPa, followed by performing the reaction until reaching a softening point shown in the table. There were thus obtained the target Resins A-1, A-2, and A-5.

Production Example 3

Resin A-3

An alcohol component and terephthalic acid for a resin, which are shown in Table 1, 20 g of tin(II) di(2-ethylhexanoate), and 2 g of gallic acid were added and charged in a 10 liter-volume four-necked flask equipped with a thermometer, a stainless steel-made stirring rod, a dewatering tube, a flow-down type condenser, and a nitrogen inlet tube, and the contents were allowed to react with each other at 230° C. for 8 hours in a mantle heater in a nitrogen atmosphere. Thereafter, the reaction was further performed at 230° C. under a reduced pressure condition at 8 kPa until desired physical properties were attained. There was thus obtained the target Resin A-3.

Production Example 4

Resin A-4

An alcohol component and terephthalic acid for a resin, which are shown in Table 1, 20 g of tin(II) di(2-ethylhexanoate), and 2 g of gallic acid were added and charged in a 10 liter-volume four-necked flask equipped with a thermometer, a stainless steel-made stirring rod, a dewatering tube, a flow-down type condenser, and a nitrogen inlet tube, and the contents were allowed to react with each other at 230° C. for 8 hours in a mantle heater in a nitrogen atmosphere. Thereafter, the reaction was further performed for 1 hour under a reduced pressure condition at 8 kPa. Then, the temperature was dropped to 160° C., the remaining acid was added, and the temperature was then raised to 230° C. over 4 hours. The reaction was performed at 230° C. under a reduced pressure condition at 8 kPa until desired physical properties were attained. There was thus obtained the target Resin A-4.

TABLE 1

| | | | Production Example | | | | | | | | |
|---|---|---|---|---|---|---|---|---|---|---|---|
| | | | Production Example 1 | | Production Example 2 | | Production Example 3 | | Production Example 4 | | Production Example 5 |
| | | | | | | | Polyester | | | | |
| | | | A-1 | | A-2 | | A-3 | | A-4 | | A-5 |
| | | | Charged amount (g) | Molar ratio *3 | Charged amount (g) | Molar ratio *3 | Charged amount (g) | Molar ratio *3 | Charged amount (g) | Molar ratio *3 | Charged amount (g) | Molar ratio *3 |
| Raw material monomer | Alcohol component | BPA-PO *1 | 710 | 25 | 710 | 25 | 997 | 35 | 2872 | 100 | 723 | 25 |
| | | BPA-EO *2 | 1977 | 75 | 1977 | 75 | 1719 | 65 | | | 2013 | 75 |
| | Carboxylic acid | Terephthalic acid | 1077 | 80 | 1077 | 80 | 1284 | 95 | 749 | 55 | 480 | 35 |
| | | Adipic acid | 237 | 20 | 237 | 20 | | | 300 | 25 | 784 | 65 |
| | | Trimellitic anhydride | | | | | | | 79 | 5 | | |
| Esterification catalyst | Tin(II) di(2-ethylhexanoate) | | 20 | | 20 | | 20 | | 20 | | 20 | |
| Cocatalyst | Gallic acid | | 2 | | 2 | | 2 | | 2 | | 2 | |
| Physical properties | Softening point (° C.) | | 103.6 | | 107.5 | | 110.2 | | 99.6 | | 86.1 | |
| | Acid value (mgKOH/g) | | 12.7 | | 10.9 | | 4.5 | | 2.9 | | 8.7 | |
| | Hydroxyl value (mgKOH/g) | | 13.3 | | 12.6 | | 29.1 | | 32.2 | | 10.2 | |
| | Glass transition point (° C.) | | 57.8 | | 58.0 | | 68.7 | | 52.0 | | 38.9 | |

*1 BPA-PO: Polypropylene oxide (2.2 mol) adduct of bisphenol A
*2 BPA-EO: Polyethylene oxide (2.2 mol) adduct of bisphenol A
*3 Molar amount based on 100 mol of alcohol component (mol %)

Example 1

In a mixing machine for asphalt, 9,200 g of an aggregate produced in Carretera (aggregate Grava: 2,300 g, aggregate Sello: 2,300 g, aggregate Arena: 4,600 g (see a composition of the aggregate as shown below)) was charged and mixed at 190° C. for 30 seconds. Subsequently, 660 g of modified asphalt containing 2.2% by mass of SBS was added and mixed in the mixing machine for asphalt for 1 minute. Subsequently, 165 g of Resin A-1 was added and mixed for 1 minute, and then, the mixture was stored at 180° C. for 2 hours to obtain an asphalt mixture. The resulting asphalt mixture in a state of keeping its temperature at 180° C. was charged in a mold of a Marshall stability tester and filled through double-sided compacting by dropping a weight of 4.5 kg from a height of 45 cm of 75 times per one side by using a Marshall automatic compactor, thereby obtaining an asphalt paving material layer specimen. Using the resulting asphalt paving material layer specimen, the various evaluation tests were performed.

A component ratio of the asphalt mixture is shown in Table 2, and the various evaluation test results are shown in Table 3.

<Composition of Aggregate Produced in Carretera (Mexico)>
Passing Mass %:
Sieve opening 19 mm: 98.7% by mass
Sieve opening 12.5 mm: 84.4% by mass
Sieve opening 9.5 mm: 76.7% by mass
Sieve opening 4.75 mm: 57.5% by mass
Sieve opening 2.36 mm: 34.3% by mass
Sieve opening 1.18 mm: 22.6% by mass
Sieve opening 0.6 mm: 13.8% by mass
Sieve opening 0.3 mm: 10.3% by mass
Sieve opening 0.15 mm: 7.8% by mass
Sieve opening 0.075 mm: 4.6% by mass

Examples 2 to 4

Specimens were obtained in the same manner as in Example 1, except for using components having the kind and amount shown in Tables 2 and 3. The various evaluation tests were performed, and results thereof are shown in Table 3.

Comparative Examples 1 to 3

Specimens were obtained in the same manner as in Example 1, except for using components having the kind and amount shown in Tables 2 and 3. The various evaluation tests were performed, and results thereof are shown in Table 3.

TABLE 2

| | Asphalt mixture | | | | | | | | | | |
|---|---|---|---|---|---|---|---|---|---|---|---|
| | Binder mixture | | | | | | | | Aggregate | | |
| | | | | Asphalt | Thermoplastic elastomer | Polyester resin | | | | Coarse aggregate | Fine aggregate |
| | Kind | Kind *1 | Blending amount (g) | Ratio *2 (mass %) | Ratio *2 (mass %) | Kind | Blending amount (g) | Ratio *2 (mass %) | Ratio *3 (parts by mass) | Blending amount (g) | Proportion *4 (mass %) | Proportion *4 (mass %) |
| Example 1 | AS-1 | MAS-1 | 660 | 78 | 2 | A-1 | 165 | 20 | 26 | 9200 | 65.7 | 34.3 |
| Example 2 | AS-2 | MAS-1 | 660 | 78 | 2 | A-2 | 165 | 20 | 26 | 9200 | 65.7 | 34.3 |

TABLE 2-continued

| | | Asphalt mixture | | | | | | | | | |
|---|---|---|---|---|---|---|---|---|---|---|---|
| | | Binder mixture | | | | | | | Aggregate | | |
| | | | | Thermo-plastic | Polyester resin | | | | | Coarse aggregate | Fine aggregate |
| | Kind | Kind *1 | Blending amount (g) | Asphalt Ratio *2 (mass %) | elastomer Ratio *2 (mass %) | Kind | Blending amount (g) | Ratio *2 (mass %) | Ratio *3 (parts by mass) | Blending amount (g) | Propor-tion *4 (mass %) | Propor-tion *4 (mass %) |
| Example 3 | AS-3 | MAS-1 | 660 | 78 | 2 | A-3 | 165 | 20 | 26 | 9200 | 65.7 | 34.3 |
| Example 4 | AS-4 | MAS-1 | 660 | 78 | 2 | A-4 | 165 | 20 | 26 | 9200 | 65.7 | 34.3 |
| Comparative Example 1 | AS-51 | MAS-1 | 660 | 98 | 2 | — | — | — | — | 9200 | 65.7 | 34.3 |
| Comparative Example 2 | AS-52 | MAS-1 | 660 | 88 | 2 | A-1 | 73 | 10 | 11 | 9200 | 65.7 | 34.3 |
| Comparative Example 3 | AS-53 | MAS-1 | 660 | 78 | 2 | A-5 | 165 | 20 | 26 | 9200 | 65.7 | 34.3 |

*1 MAS-1: Modified asphalt containing 2.2% by mass of SBS
*2 Proportion relative to the total amount of asphalt, thermoplastic elastomer, and polyester
*3 Ratio based on 100 parts by mass of asphalt (parts by mass)
*4 Ratio of each aggregate relative to the whole of aggregates

TABLE 3

| | | | Evaluation | |
|---|---|---|---|---|
| | Asphalt mixture | | | Stress |
| | | Polyester | | relaxation |
| | Kind | Kind | Ratio *1 (parts by mass) | Stability (kN) | Flow value (mm) |
| Example 1 | AS-1 | A-1 | 26 | 21.5 | 3.7 |
| Example 2 | AS-2 | A-2 | 26 | 16.1 | 5.3 |
| Example 3 | AS-3 | A-3 | 26 | 13.8 | 3.8 |
| Example 4 | AS-4 | A-4 | 26 | 15.4 | 3.2 |
| Comparative Example 1 | AS-51 | — | — | 11.6 | 2.9 |
| Comparative Example 2 | AS-52 | A-1 | 11 | 12.0 | 4.4 |
| Comparative Example 3 | AS-53 | A-5 | 26 | 11.8 | 5.8 |

*1 Ratio based on 100 parts by mass of asphalt (parts by mass)

In the light of the above, it is noted that in accordance with the asphalt mixtures of the Examples, the asphalt paving material layer in which both excellent stability and stress relaxation are made compatible with each other is obtained, as compared with those of the Comparative Examples.

The invention claimed is:

1. A road paving method comprising
Step 1: a step of mixing asphalt, a thermoplastic elastomer, a polyester, and an aggregate to obtain an asphalt mixture, and
Step 2: a step of laying the asphalt mixture obtained in Step 1 on a road, thereby forming an asphalt paving material layer, wherein
the polyester comprises an alcohol component-derived structural unit containing 60 mol % or more of an alkylene oxide adduct of bisphenol A and a carboxylic acid component-derived structural unit containing 50 mol % or more of at least one selected from the group consisting of terephthalic acid and isophthalic acid, has a hydroxyl value of 1 mgKOH/g or more and 20 mgKOH/g or less, has a softening point of 90° C. or higher and 140° C. or lower and has a glass transition point of 40° C. or higher and 80° C. or lower, and
a ratio of the polyester is more than 17 parts by mass and 50 parts by mass or less based on 100 parts by mass of the asphalt.

2. The road paving method according to claim 1, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, a styrene/isoprene random copolymer, an ethylene/vinyl acetate copolymer, and an ethylene/acrylic acid ester copolymer.

3. The road paving method according to claim 1, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer.

4. An asphalt mixture for use in the road paving method according to claim 1,
wherein the asphalt composition comprises said asphalt, said thermoplastic elastomer, said polyester, and said aggregate,
wherein the polyester comprises an alcohol component-derived structural unit containing 60 mol % or more of an alkylene oxide adduct of bisphenol A and a carboxylic acid component-derived structural unit containing 50 mol % or more of at least one selected from the group consisting of terephthalic acid and isophthalic acid, has a hydroxyl value of 1 mgKOH/g or more and 20 mgKOH/g or less, has a softening point of 90° C. or higher and 140° C. or lower and has a glass transition point of 40° C. or higher and 80° C. or lower, and
wherein a ratio of the polyester is more than 17 parts by mass and 50 parts by mass or less based on 100 parts by mass of the asphalt.

* * * * *